United States Patent
Bae

(10) Patent No.: US 8,872,720 B2
(45) Date of Patent: Oct. 28, 2014

(54) APPARATUS FOR CONTROLLING IMPEDANCE IN ADAPTIVE TUNING ANTENNA CIRCUIT

(75) Inventor: Su Ho Bae, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 354 days.

(21) Appl. No.: 13/384,525

(22) PCT Filed: Aug. 13, 2010

(86) PCT No.: PCT/KR2010/005322
§ 371 (c)(1),
(2), (4) Date: Jan. 17, 2012

(87) PCT Pub. No.: WO2011/019231
PCT Pub. Date: Feb. 17, 2011

(65) Prior Publication Data
US 2012/0119971 A1   May 17, 2012

(30) Foreign Application Priority Data

Aug. 13, 2009   (KR) .................. 10-2009-0074619

(51) Int. Cl.
*H01Q 9/00* (2006.01)
*H01Q 1/50* (2006.01)
*H04B 1/04* (2006.01)

(52) U.S. Cl.
CPC .................................... *H04B 1/0458* (2013.01)
USPC ............ 343/861; 343/860; 343/745; 343/750

(58) Field of Classification Search
CPC .......... H03H 7/40; H03H 7/0115; H03H 7/42
USPC .................. 343/860, 745, 750, 861
See application file for complete search history.

(56) References Cited

U.S. PATENT DOCUMENTS

| 5,778,308 A * | 7/1998 | Sroka et al. ................. 455/115.1 |
| 2002/0047760 A1* | 4/2002 | Kunikiyo ...................... 333/214 |
| 2007/0200766 A1 | 8/2007 | McKinzie, III et al. |

(Continued)

FOREIGN PATENT DOCUMENTS

| EP | 0210746 A2 | 4/1987 |
| EP | 0685936 A2 | 6/1995 |

(Continued)

OTHER PUBLICATIONS

Notice of Allowance dated Nov. 14, 2011 in Korean Application No. 10-2009-0074619, filed Aug. 13, 2009.

(Continued)

*Primary Examiner* — Dameon E Levi
*Assistant Examiner* — Ricardo Magallanes
(74) *Attorney, Agent, or Firm* — Saliwanchik, Lloyd & Eisenschenk

(57) ABSTRACT

An apparatus for controlling impedance in an adaptive tuning antenna circuit is disclosed, wherein a matching unit is connected to an output terminal where a coupler outputs a coupled power of a transmission signal, a controller adjusts an impedance of the matching unit to cause the reflected power outputted by the coupler to be minimized, and the controller adjusts an impedance of a tuner to allow a combined impedance of the tuner and an antenna to be equal to the impedance of the matching unit but with opposite phases, thereby adjusting the impedance of the antenna in the optimal state.

8 Claims, 4 Drawing Sheets

(56) References Cited

U.S. PATENT DOCUMENTS

2008/0261544 A1* 10/2008 Blin ............................. 455/121
2009/0046030 A1 2/2009 Song et al.
2011/0183628 A1* 7/2011 Baker ........................ 455/67.14

FOREIGN PATENT DOCUMENTS

| KR | 10-0570072 B1 | 4/2006 |
|---|---|---|
| KR | 10-0670161 B1 | 1/2007 |
| KR | 10-2007-0106228 A | 11/2007 |
| KR | 10-2008-0007635 A | 1/2008 |
| WO | WO-2008/129125 A1 | 10/2008 |

OTHER PUBLICATIONS

International Search Report in International Application No. PCT/KR2010/005322, filed Aug. 13, 2010.
Supplementary European Search Report dated Feb. 19, 2013 in European Application No. 10808380.9, filed Aug. 13, 2010.

* cited by examiner

APPARATUS FOR CONTROLLING IMPEDANCE IN ADAPTIVE TUNING ANTENNA CIRCUIT

CROSS-REFERENCE TO RELATED APPLICATIONS

This application is the U.S. national stage application of International Patent Application No. PCT/KR2010/005322, filed Aug. 13, 2010,which claims priority to Korean Application No. 10-2009-0074619, filed Aug. 13, 2009, the disclosures of each of which are incorporated herein by reference in their entirety.

TECHNICAL FIELD

The present invention relates to an apparatus for controlling impedance in adaptive tuning antenna circuit.

BACKGROUND ART

An antenna circuit in a mobile terminal functions to transmit a predetermined radio signal through an antenna or receive the signal. In order for an antenna to have an optimal transmission/reception radiation performance, impedances are correctly matched. Therefore, the antenna circuit includes a capacitor and an inductor, where capacitor and inductor values are controlled to match the impedances of the antenna in the optimal state.

In general, the impedance matching is to match impedances of an antenna while a mobile terminal is positioned at a free space. Meanwhile, a mobile terminal is characteristically used in such a manner where a body of the mobile terminal is held by a hand and a speaker is touched to an ear, or the body of the mobile terminal is put into a pocket or a bag using an earphone.

According as a user utilizes the mobile terminal by holding a body of the mobile terminal, touches the body to an ear, or puts the body into a pocket or a bag, an impedance matching condition of an antenna becomes variable, whereby the transmission/reception radiation performance of the antenna whose impedance has been matched in a free space inevitably decreases.

As a result, a mobile terminal adopts an adaptive tuning antenna circuit having an antenna that has an optimal transmission/reception radiation performance by automatically controlling impedance of the antenna, in a case the impedance matching condition of the antenna is changed. It is imperative that a changed impedance state of an antenna be detected in order for the adaptive tuning antenna circuit to maintain in an optimal state. To this end, the adaptive tuning antenna circuit is coupled with a coupler and detects a reflected power and a forward power outputted by the coupler. A tuner is adjusted to control the impedance of the antenna based on the detected reflected power and the forward power.

However, in order to control the impedance of the antenna by detecting the reflected power and the forward power, it is essential that two power detectors be used to detect the reflected power and the forward power. The impedance control is to actually measure the reflected power reflected from an antenna that is resultant from an impedance mismatching of the antenna. Therefore, there occurs a problem in which an output of a signal emitted from an antenna is actually changed in the course of optimally matching the impedance of the antenna.

DISCLOSURE OF INVENTION

Technical Problem

It is an object of the present invention to provide an apparatus for controlling impedance in adaptive tuning antenna circuit configured to control an impedance of an antenna by using one power detector.

It is another object of the present invention to provide an apparatus for controlling impedance in adaptive tuning antenna circuit configured to dispense with change of a signal that is actually emitted in the course of seeking an optimal antenna matching value.

Technical problems to be solved by the present invention are not restricted to the above-mentioned objects, and any other technical problems not mentioned so far will be clearly appreciated from the following description by skilled in the art.

Solution to Problem

Objects of the invention are to solve at least one or more of the above problems and/or disadvantages in a whole or in part and to provide at least the advantages described hereinafter. In order to achieve at least the above objects, in whole or in part, and in accordance with the purposes of the disclosure, as embodied and broadly described, there is provided an apparatus for controlling impedance in an adaptive tuning antenna circuit, characterized by: a coupler configured to output an inputted transmission signal to a transmission signal output terminal and to output a coupled power of the transmission signal and a reflected power; a tuner configured to control an impedance of an antenna and to supply a transmission signal outputted by the coupler to the antenna; a matching unit configured to be matched to the coupled power outputted by the coupler; a power detector configured to detect a level of the reflected power outputted by the coupler; and a controller configured to control an impedance of the matching unit by tracing a position of an impedance capable of minimizing the level of reflected power detected by the power detector, and control the impedance of the antenna based on an impedance of the matching unit.

In some exemplary embodiments of the present invention, the impedance of the tuner may be controlled in such a manner that a combined impedance of the tuner and the antenna is same as an impedance of the matching unit while phases are opposite.

In some exemplary embodiments of the present invention, the matching unit may include a pin diode connnected to an output terminal where the coupler outputs a coupling power, and an RF (Radio Frequency) is changed by control of the controller, a varactor connnected to an output terminal where the coupler outputs a coupling power, and a capacitance is changed by control of the controller, and an inductor connected in series to the varactor.

In some exemplary embodiments of the present invention, a capacitor for interrupting a DC (Direct Current) signal may be interposed between the output terminal where the coupler outputs the coupling power, the serially-connected varactor and the inductor.

In some exemplary embodiments of the present invention, the matching unit may include a bias resistor supplying a control current outputted by the controller to a control terminal of the pin diode.

In some exemplary embodiments of the present invention, the apparatus for controlling impedance in an adaptive tuning antenna circuit may include a memory where a control signal for varying a tuner impedance based on impedance variation of the matching unit is prestored in a look-up table.

In another aspect of the present invention, an apparatus for controlling impedance in an adaptive tuning antenna circuit is provided, characterized by: a coupler configured to output an inputted transmission signal to a transmission signal output terminal and to output a coupled power of the transmission signal and a reflected power; a matching unit configured to be matched to the coupled power outputted by the coupler; a power detector configured to detect a level of the reflected power outputted by the coupler; and a controller configured to control an impedance of the matching unit by tracing a position of an impedance capable of minimizing the level of reflected power detected by the power detector.

In some exemplary embodiments of the present invention, the matching unit may include a pin diode connnected to an output terminal where the coupler outputs a coupling power, and an RF (Radio Frequency) is changed by control of the controller, a varactor connnected to an output terminal where the coupler outputs a coupling power, and a capacitance is changed by control of the controller, and an inductor connected in series to the varactor.

In some exemplary embodiments of the present invention, a capacitor for interrupting a DC (Direct Current) signal may be interposed between the output terminal where the coupler outputs the coupling power, the serially-connected varactor and the inductor.

In some exemplary embodiments of the present invention, the matching unit may include a bias resistor supplying a control current outputted by the controller to a control terminal of the pin diode.

Advantageous Effects of Invention

The an apparatus for controlling impedance in an adaptive tuning antenna circuit according to the present invention has advantageous effects in that an output terminal where a coupler outputs a coupling power is formed with a matching unit, an impedance of the matching unit is changed, and a level of reflected power outputted by the coupler is detected by one power detector to make the level of the reflected power minimized. Furthermore, a tuner unit is controlled to adjust in such a manner that a combined impedance of the tuner unit and an antenna is equal to an impedance of the matching unit while phase is made to be opposite, whereby an impedance of the antenna is matched. Therefore, the impedance of the antenna can be accurately matched using one power detector only. Still furthermore, the present invention is characterized in that an impedance of the matching unit is changed to adjust the tuner unit and to match the impedance of the antenna, and there is actually no change in output of signal radiated from the antenna in the course of matching the impedance of the antenna.

BEST MODE FOR CARRYING OUT THE INVENTION

In describing the present disclosure, detailed descriptions of constructions or processes known in the art may be omitted to avoid obscuring appreciation of the invention by a person of ordinary skill in the art with unnecessary detail regarding such known constructions and functions. The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
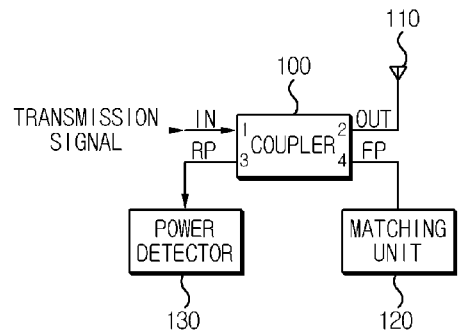
FIG. 1 is a schematic view illustrating an operation principle of an apparatus for controlling impedance in an adaptive tuning antenna circuit according to the present invention.

FIG. 1 is a schematic view illustrating an operation principle of an apparatus for controlling impedance in an adaptive tuning antenna circuit according to the present invention, where reference numeral 100 is a coupler.

The coupler (100) outputs a transmission signal to an input terminal (IN), outputs the inputted transmission signal to an output terminal (OUT) and provides the signal to an antenna (110). The coupler (100) also outputs to a coupling power output terminal (FP) a coupled power of a transmission signal whose level is weaker than that of a transmission signal outputted to the transmission signal output terminal (OUT). The coupler (100) further outputs the coupled power to the transmission signal output terminal (OUT), and outputs to a reflected power output terminal (RP) a coupled power of reflected wave reflected from the antenna (110) and a reflected power reflected from the coupled power output terminal (FP).

The coupled power output terminal (FP) is disposed with a matching unit (120), and the coupled power output terminal (RP) of reflected wave is disposed with a power detector (130). At this time, if a reflection coefficient of the antenna (110) is defined as φa, and that of the matching unit(120) is defined as φb, a signal reflected from the antenna(110) and outputted to the reflected power output terminal(RP) is defined as Sout_A, and a signal reflected from the matching unit(120) and outputted to the reflected power ouput terminal (RP) is defined as Sout_M, the Sout_A and Sout_M may be obtained by the following Equations 1 and 2.

$$\text{Sout\_}A = S_{21} \times \phi a \times S_{42} \quad \text{<Equation 1>}$$

$$\text{Sout\_}M = S_{31} \times \phi b \times S_{43} \quad \text{<Equation 2>}$$

where, Sxy(x and y are 1, 2, 3, 4) is an strength of a signal that is inputted to y terminal and outputted to x terminal. As $S_{31}=S_{42}$, and $S_{43}=S_{21}$, Sout_M of the Equation 2 may be substituted by the following Equation 3.

$$\text{Sout\_}M = S_{42} \times \phi b \times S_{21} = S_{21} \times \phi b \times S_{42} \quad \text{<Equation 3>}$$

In comparison between the Equation 1 an the Equation 3, it can be noted that the signal value of Sout_A reflected from the antenna (110) and outputted to the reflected power and a signal value of Sout_M reflected from the matching unit (120) and outputted to the reflected power output terminal (RP) have a difference as much as a reflection coefficient$\phi$a of the antenna (110) and a reflection coefficient$\phi$b of the matching unit (120). A signal Sout reflected from the antenna (110) and the matching unit (110), and outputted to the reflected power output terminal (RP) may be obtained by the following Equation 4.

$$\text{Sout} = \text{Sout\_}A + \text{Sout\_}M = S_{21} \times S_{42} \times (\phi a + \phi b) \quad \text{<Equation 4>}$$

Based on the Equation 4, it can be noted that the reflection coefficient$\phi$a of the antenna (110) and the reflection coefficient$\phi$b of the matching unit (120) are equal, and if a phase between the two is opposite, the reflection coefficient$\phi$a and the reflection coefficient$\phi$b are offset therebetween, and the size of Sout is zero (o).

Therefore, in a case the impedance of the matching unit (120) is properly adjusted, and the size of Sout outputted to the reflected power output terminal (RP) of the coupler (100) is detected by a power detector (130), impedance information from the transmission signal output terminal (OUT) of the coupler (100) to the antenna (110) may be obtained. Because, in a case the strength of the reflected power detected by the power detector (130) is small, the impedance from the transmission signal output terminal (OUT) of the coupler (100) to the antenna (110) is equal to that of the matching unit (120) but the phase is opposite.

Figure 2:
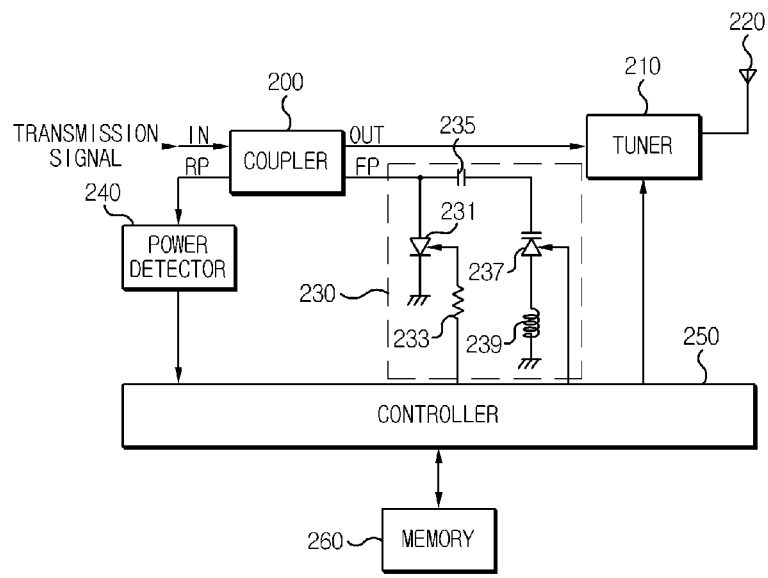
FIG. 2 is a schematic view illustrating a structure of an apparatus for controlling impedance in an adaptive tuning antenna circuit according to the present invention.

FIG. 2 is a schematic view illustrating a structure of an apparatus for controlling impedance in an adaptive tuning antenna circuit according to the present invention, where reference numeral 200 is a coupler. The coupler (200) outputs a transmission signal inputted to the input terminal (IN) to the transmission signal output terminal (OUT).

The coupler (200) also outputs to a coupling power output terminal (FP) a coupled power of a transmission signal whose level is weaker than that of a transmission signal outputted to the transmission signal output terminal (OUT). The coupler (200) further outputs to a reflected power output terminal (RP) a reflected power reflected from the transmission signal output terminal (OUT) and the coupled power output terminal (FP). The transmission signal output terminal (OUT) of the coupler (200) is connected to an antenna (220) through a tuner (210) whose impedance is changed in response to a control signal. The coupled power output terminal (FP) of the coupler (200) is connected to a matching unit (230), and the coupled power output terminal (RP) of reflected wave at the coupler (200) is connected to a power detector (240).

The matching unit (230) is configured in such a manner that the coupled power output terminal (FP) is connected by a pin diode (231), and a control terminal of the pin diode (231) is connected by a bias resistor (233). Furthermore, the coupled power output terminal (FP) is serially connected by a DC interruption capacitor (235), a varactor (237) and an inductor (239), and a control terminal of the varactor (237) is applied with a control voltage.

Reference numeral 250 is a controller. The controller (250) supplies a control current to the pin diode (231) through the bias resistor (233), and supplies a control voltage to the varactor (237), whereby impedance of the matching unit (230) is changed to allow a level of the reflected power detected by the power detector (240) to be minimized.

The controller (250) controls the tuner (210) to allow a combined impedance of the tuner (210) and the antenna (220) to be equal to that of the matching unit, and to allow phases to be mutually opposite. Reference numeral 260 is a memory. The memory (260) is pre-stored with a control signal of the tuner (210) that allows a combined impedance of the tuner (210) and the antenna (220) to be equal to an impedance of the matching unit (230) according to the controller (250).

In the apparatus thus configured for controlling impedance in an adaptive tuning antenna circuit, a transmission signal to be wirelessly transmitted is inputted to an input terminal (IN) of the coupler (200) and is outputted to the transmission signal output terminal (OUT). The transmission signal outputted to the transmission signal output terminal (OUT) of the coupler (200) is applied to the antenna (220) through the tuner (210) and is wirelessly transmitted.

Furthermore, the coupler (200) also outputs to a coupling power output terminal (FP) a coupled power of a transmission signal whose level is weaker than that of a transmission signal outputted to the transmission signal output terminal (OUT). The coupler (100) further outputs the coupled power to the transmission signal output terminal (OUT), and outputs to a reflected power output terminal (RP) a reflected power outputted to the transmission signal output terminal (OUT) by being reflected, and outputs to a reflected power output terminal (RP) a reflected power outputted to the coupled power output terminal (FP) by being reflected.

The reflected power outputted to the reflected power output terminal(RP) of the coupler (200) is outputted to the power detector (240) to detect a level of the reflected power, and the detected level of the reflected power is inputted to the controller (250).

Under this circumstance, the controller (250) outputs the control signal to the matching unit (230) to vary an RF impedance of pin diode (231) and a capacitance of varactor (237), whereby the impedance of the matching unit (230) is varied.

Figure 3:
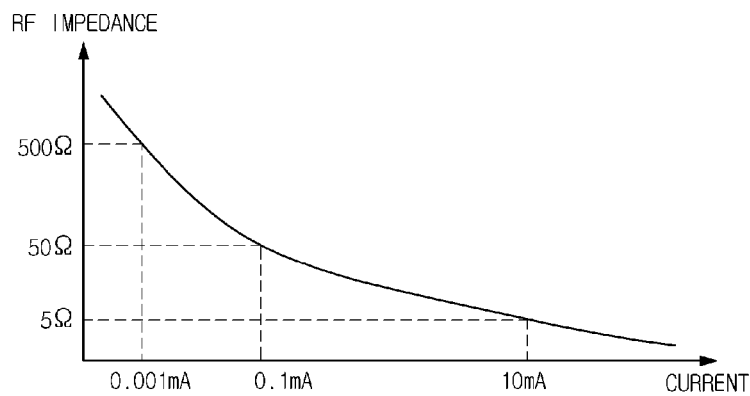
FIG. 3 is a graph illustrating a current-RF impedance characteristic of a pin diode used in an apparatus for controlling impedance in an adaptive tuning antenna circuit according to the present invention.
Figure 4:
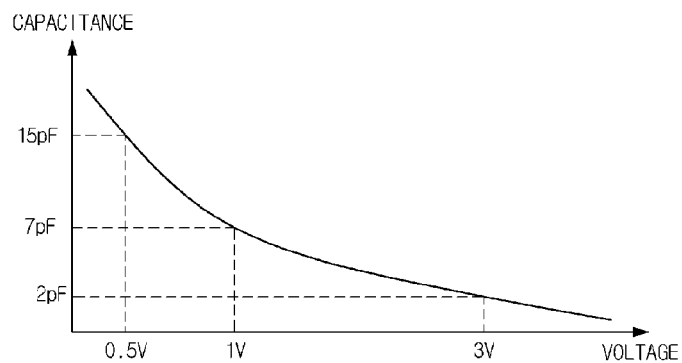
FIG. 4 is a graph illustrating a voltage-capacitance characteristic of a varactor used in an apparatus for controlling impedance in an adaptive tuning antenna circuit according to the present invention.

That is, the pin diode (231) is such that the RF impedance value is changed in response to the control current applied to a control terminal, as illustrated in FIG. 3, for example. The varactor (237) is such that capacitance is changed in response to the voltage applied to the control terminal as shown in FIG. 4.

Figure 5:
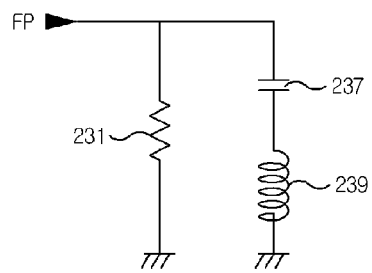
FIG. 5 is an equivalent circuit diagram of a matching unit used in an apparatus for controlling impedance in an adaptive tuning antenna circuit according to the present invention.

If the matching unit (230) is illustrated in an equivalent circuit, the varactor (237) as a tunable dielectric capacitor and the inductor (239) are serially connected as depicted in FIG. 5. An RF impedance is formed by a structure in which the pin diode (231) and the varactor (237) as a tunable dielectric capacitor and the inductor (239) are connected in parallel.

The controller (250) generates a control current, and the generated control current is supplied to the pin diode (231) through the bias resistor (233) to vary the RF impedance of the pin diode (233). The controller (250) also generates a control voltage, and the generated control voltage is applied to a control terminal of the varactor (237) to allow the varactor (237) to have a predetermined capacitance responsive to the control voltage.

As explained in foregoing, the controller (250) changes the RF impedance of the pin diode (231) and capacitance of the varactor (237) to cause the impedance of the matching unit (230) to change. FIGS. 6, 7, 8 and 9 illustrate variable RF impedance of the matching unit (230) on respective Admittance Charts which can be used as Smith Charts merely by rotating through 180 degrees.

Mode For The Invention

Figure 6:
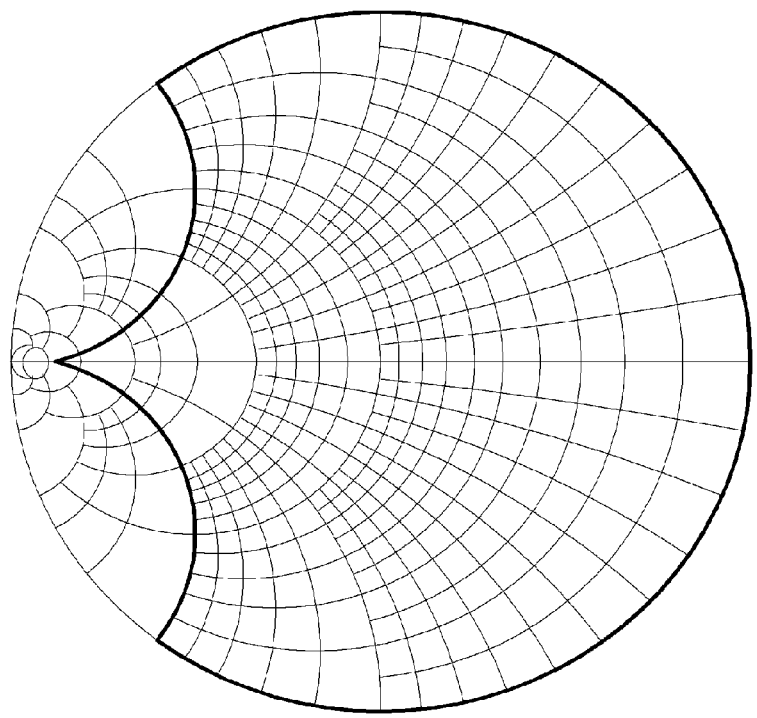
FIGS. 6 and 7 are respective admittance charts in a case a capacitance value of a varactor disposed at a matching unit is increased and in a case a capacitance value of a varactor disposed at a matching unit is decreased in an apparatus for controlling impedance in an adaptive tuning antenna circuit according to the present invention.
Figure 7:
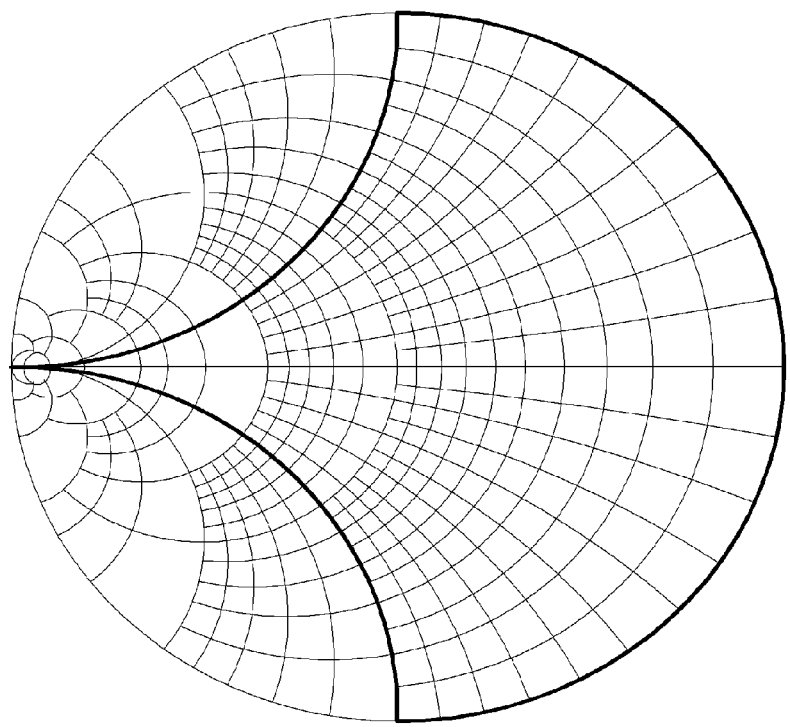

FIGS. 6 and 7 are respective admittance charts in a case a capacitance value of the varactor (237) disposed at the matching unit (230) is increased, and in a case a capacitance value of the varactor disposed at the matching unit is decreased in an apparatus for controlling impedance in an adaptive tuning antenna circuit according to the present invention.

Referring to FIGS. 6 and 7, it can be noted that variation of capacitance value of the varactor (237) can vary the RF impedance of the matching unit (230) within a corresponding area.

Figure 8:
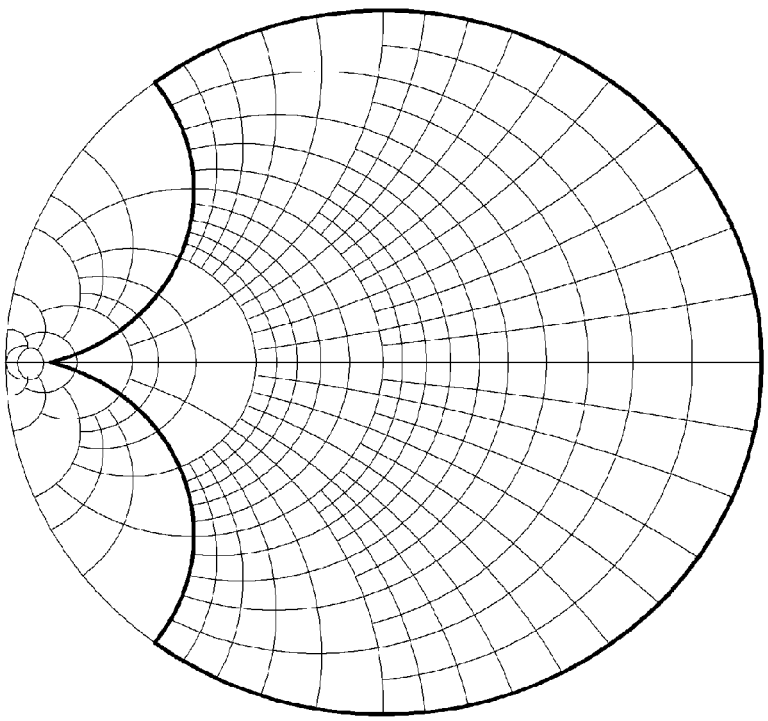
FIGS. 8 and 9 are respective admittance charts in a case an RF impedance of a pin diode disposed at a matching unit is set up to a high value and in a case an RF impedance of a pin diode disposed at a matching unit is set up to a low value in an apparatus for controlling impedance in an adaptive tuning antenna circuit according to the present invention.
Figure 9:
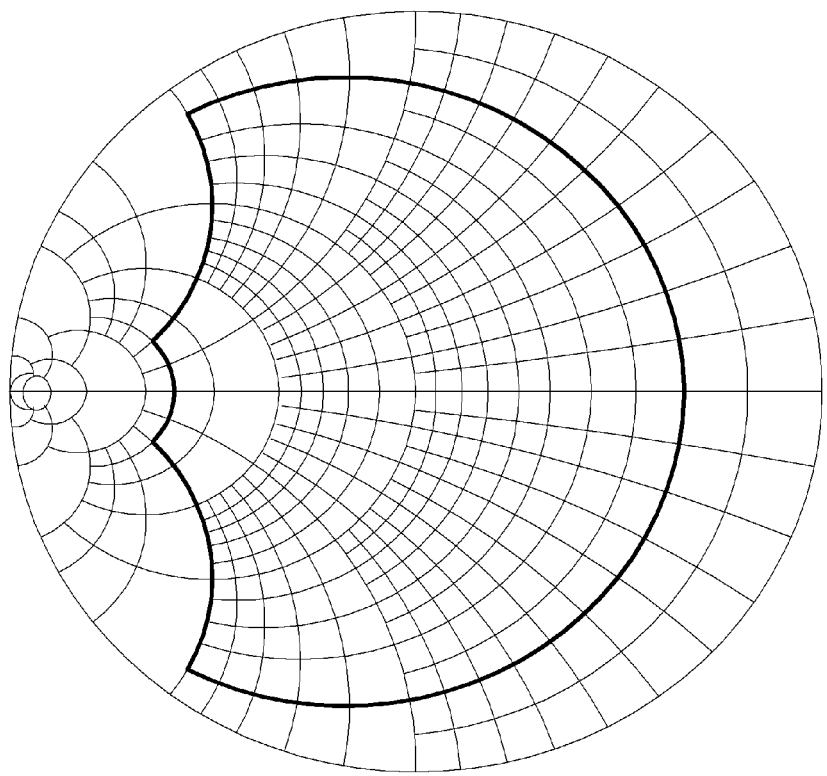

FIGS. 8 and 9 are respective admittance charts in a case an RF impedance of the pin diode (231) disposed at the matching unit (230) is set up to a high value, and in a case an RF impedance of the pin diode (231) disposed at the matching unit (230) is set up to a low value in an apparatus for controlling impedance in an adaptive tuning antenna circuit according to the present invention.

Referring to FIGS. 8 and 9, it can be noted that variation of RF impedance value of the pin diode (231) can vary the RF impedance of the matching unit (230) within a corresponding area. As noted from the figures, the RF impedance of the pin diode (231) can be changed within an area depicted in FIGS. 6 and 7, and the capacitance of the varactor (237) can be changed within an area shown in FIGS. 8 and 9.

Therefore, it can be noted that a point where the power detected by the power detector (240) in the area is minimized is the very point near a point where the combined impedance of the tuner (210) and the antenna (220) is equal size-wise to an impedance of the matching unit (230), and phases are opposite, and using this fact, the impedance of the tuner (210) can be adjusted to obtain the optimal antenna impedance matching.

According to the present invention, the controller (250) changes the impedance of the matching unit (230), and seeks a control signal corresponding to the changed impedance of the matching unit (230) on a look-up table in the memory (260) and outputs the control signal to the tuner (210). Then, the tuner (210) changes the impedance in respons to the control signal outputted by the controller (250), where the combined impedance of the tuner (210) and the antenna (220) becomes equal to the impedance of the matching unit (230) but phases mutually become opposite.

That is, the memory (260) is pre-stored on a look-up table thereof with a control signal for outputting to the tuner (210) that corresponds to the control signal outputted to the matchning unit (230). The control signal pre-stored in the memory (260) by way of look-up table causes the combined impedance of the tuner (210) and the antenna (22) to be equal to the RF impedance of the matching unit (230) with phases being opposite, where the controller (250) changes the RF impedance of the matching unit (230) and simultaneously changes the impedance of the tuner (210).

Under this circumstance, the controller (250) inputs the level of reflected power detected by the power detector (240), and traces a position of the impedance that causes the inputted level of reflected power to be minimized to change the RF impedance of the matching unit (230), and simultaneously changes the impedance of the tuner (210) based on the variation of the RF impedance of the matching unit (230).

Furthermore, in a case the level of the reflected power detected by the power detector (240) is minimized, the impedance of the antenna (220) is matched in the optimal state, where the antenna (220) operates with the optimal transmission/reception emission performance.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

Industrial Applicability

The apparatus for controlling impedance in adaptive tuning antenna circuit according to the present invention has industrial applicability in that impedance of an antenna can be adjusted and matched in the optimal state while the output of signal from the antenna is unchanged.

The invention claimed is:

1. An apparatus for controlling impedance in an adaptive tuning antenna circuit, the apparatus comprising:
a coupler configured to output an inputted transmission signal to a transmission signal output terminal, to output a coupled power of the transmission signal to a coupling power output terminal, to output a reflected power to a reflected power output terminal;
a tuner configured to control an impedance of an antenna and to supply the transmission signal outputted by the coupler to the antenna;
a matching unit configured to be matched to the coupled power outputted by the coupler;
a power detector configured to detect a level of the reflected power outputted by the coupler; and
a controller configured to control an impedance of the matching unit by tracing a position of an impedance capable of minimizing the level of reflected power detected by the power detector, and control the impedance of the antenna based on an impedance of the matching unit,
wherein the matching unit comprises:
a pin diode connected to the coupling power output terminal by an anode of the pin diode, wherein a radio frequency (RF) impedance of the pin diode is changed by control of the controller;
a varactor connected to the coupling power output terminal by a cathode of the varactor, connected in parallel to the pin diode, wherein a capacitance of the varactor is changed by control of the controller; and
an inductor connected in series to an anode of the varactor.

2. The apparatus of claim 1, wherein an impedance of the tuner is controlled in such a manner that a combined impedance of the tuner and the antenna is same as the impedance of the matching unit while phases are opposite.

3. The apparatus of claim 1, further comprising a capacitor configured to interrupt direct current (DC) signal, the capacitor interposed between the coupling power output terminal of the coupler and the varactor.

4. The apparatus of claim 1, wherein the matching unit includes a bias resistor supplying a control current outputted by the controller to a control terminal of the pin diode.

5. The apparatus of claim 1, further comprising a memory to pre-store a control signal for varying the impedance of the tuner based on impedance variation of the matching unit, the control signal prestored in a look-up table of the memory.

6. An apparatus for controlling impedance in an adaptive tuning antenna circuit, the apparatus comprising:
a coupler configured to output an inputted transmission signal to a transmission signal output terminal, to output a coupled power of the transmission signal to a coupling power output terminal, and to output a reflected power to a reflected power output terminal;

a matching unit configured to be matched to the coupled power outputted by the coupler;

a power detector configured to detect a level of the reflected power outputted by the coupler; and a controller configured to control an impedance of the matching unit by tracing a position of an impedance capable of minimizing the level of reflected power detected by the power detector, wherein the matching unit comprises:

a pin diode connected to the coupling power output terminal by an anode of the pin diode wherein a radio frequency (RF) impedance of the pin diode is changed by control of the controller;

a varactor connected to the coupling power output terminal by a cathode of the varactor, connected in parallel to the pin diode wherein a capacitance of the varactor is changed by control of the controller; and an inductor connected in series to an anode of the varactor.

7. The apparatus of claim 6, further comprising a capacitor for interrupting a direct current (DC) signal wherein the capacitor is interposed between the coupling power output terminal of the coupler and the varactor.

8. The apparatus of claim 6, wherein the matching unit includes a bias resistor supplying a control current outputted by the controller to a control terminal of the pin diode.

* * * * *